United States Patent [19]

Yang et al.

[11] Patent Number: 5,648,112
[45] Date of Patent: Jul. 15, 1997

[54] PROCESS FOR PREPARING CHILLED BEVERAGE PRODUCTS CONTAINING MILK AND A FOOD ACID

[75] Inventors: David Kee Yang, Cincinnati; Matthew Thomas Heisey, Wyoming; Raul Victorino Nunes, Loveland, all of Ohio

[73] Assignee: The Procter & Gamble Company, Cincinnati, Ohio

[21] Appl. No.: 412,490

[22] Filed: Mar. 28, 1995

[51] Int. Cl.⁶ .................................................. A23C 9/00
[52] U.S. Cl. .................... 426/580; 426/574; 426/577; 426/583; 426/599
[58] Field of Search .................................. 426/573, 574, 426/577, 580, 583, 587, 590, 599

[56] References Cited

U.S. PATENT DOCUMENTS

| | | | |
|---|---|---|---|
| 2,818,342 | 12/1957 | Ransom | 99/105 |
| 2,853,386 | 9/1958 | Hughes | 99/54 |
| 2,859,115 | 11/1958 | Rivoche | 99/28 |
| 2,919,195 | 12/1959 | Block | 99/105 |
| 2,982,654 | 5/1961 | Hammond et al. | 99/116 |
| 3,340,066 | 9/1967 | Corbin et al. | 99/54 |
| 3,359,116 | 12/1967 | Little | 99/54 |
| 3,625,702 | 12/1971 | Exler | 99/59 |
| 3,647,476 | 3/1972 | Swisher | 99/195 |
| 3,692,532 | 9/1972 | Shenkenberg et al. | 99/28 |
| 3,764,710 | 10/1973 | Inagami et al. | 426/185 |
| 3,792,171 | 2/1974 | Little | 426/38 |
| 3,862,342 | 1/1975 | Maraulja et al. | 426/185 |
| 3,917,852 | 11/1975 | Maraulja et al. | 426/48 |
| 3,949,098 | 4/1976 | Bangert | 426/324 |
| 3,953,610 | 4/1976 | Little | 426/39 |
| 4,046,925 | 9/1977 | Ogoe | 426/573 |
| 4,061,792 | 12/1977 | Ingami et al. | 426/330.2 |
| 4,078,092 | 3/1978 | Nishiyama | 426/584 |
| 4,169,854 | 10/1979 | Igoe | 426/583 |
| 4,212,893 | 7/1980 | Takahata | 426/330.2 |
| 4,374,155 | 2/1983 | Igoe et al. | 426/569 |
| 4,376,126 | 3/1983 | Evers | 426/43 |
| 4,416,905 | 11/1983 | Lundstedt et al. | 426/34 |
| 4,435,439 | 3/1984 | Morris | 426/565 |
| 4,478,855 | 10/1984 | Dahlen et al. | 426/41 |
| 4,486,413 | 12/1984 | Wiesenberger et al. | 424/177 |
| 4,590,077 | 5/1986 | Trop | 426/61 |
| 4,676,988 | 6/1987 | Efstathiou et al. | 426/271 |
| 4,737,375 | 4/1988 | Nakel et al. | 426/590 |
| 4,902,517 | 2/1990 | Nakagawa et al. | 426/11 |
| 4,919,960 | 4/1990 | Ahmed et al. | 426/580 |
| 5,006,349 | 4/1991 | Dahlstrom et al. | 426/39 |
| 5,202,145 | 4/1993 | Wisler et al. | 426/580 |

FOREIGN PATENT DOCUMENTS

| | | |
|---|---|---|
| 1066121 | 11/1979 | Canada . |
| 93395824 | 9/1993 | Canada . |
| 0083327 | 7/1983 | European Pat. Off. . |
| 0117011 | 8/1984 | European Pat. Off. . |
| 0166238 | 1/1986 | European Pat. Off. . |
| 0384816 | 8/1990 | European Pat. Off. . |
| 102918 | 11/1962 | Netherlands . |
| 898382 | 11/1989 | South Africa . |
| 1440161 | 6/1976 | United Kingdom . |
| 2095530 | 10/1982 | United Kingdom . |
| 2124067 | 2/1984 | United Kingdom . |
| WO94/18853 | 2/1994 | WIPO . |

OTHER PUBLICATIONS

Proffit, A. J. et al.; The development of a milk–grapefruit juice drink; *Food Technology in New Zealand,* Sep. 1974, pp. 9–15.

Luck, H. et al.; Fruit juice–flavoured milk, a healthy beverage; *South African Journal Dairy Technology;* 1973, vol. 5, No. 1; pp. 47–52.

Pariss, N. et al.; Effect of Processing Temperature and Storage Time on NonFat Dry Milk Proteins; *Journal of Food Science;* 1989; vol. 54, No. 5; pp. 1218–1221.

Mann, E. J.; Digest of International Dairy Publications; *Dairy Industries International;* 1985, 50(10); pp. 11–12.

*Primary Examiner*—Leslie Wong
*Attorney, Agent, or Firm*—Eric W. Guttag; Tara M. Rosnell; J. C. Rasser

[57] ABSTRACT

Chilled or shelf stable beverage products which are physically stable, visually opaque and do not precipitate over time, and a process for preparing these products, are disclosed. These products contain from about 5 to about 99.8% milk, from about 0.05 to about 0.8% of a food stabilizer and a food acid. The first step of the process involves mixing milk with a food stabilizer under high shear mixing conditions to form protein/stabilizer particles having a median particle size of less than about 0.8 microns. Then, while still maintaining the particle size of the protein/stabilizer particles at less than about 0.8 microns, the protein/stabilizer mixture is acidified to a pH ranging from about 3.2 to about 4.5. In order to maintain the requisite particle size of the protein/stabilizer particles during the acidification step, the protein/stabilizer mixture is maintained under high shear mixing conditions at a temperature ranging from about 4 to about 30° C.

18 Claims, No Drawings

PROCESS FOR PREPARING CHILLED BEVERAGE PRODUCTS CONTAINING MILK AND A FOOD ACID

FIELD OF THE INVENTION

The present invention relates to a process for preparing chilled or shelf stable beverage products which contain milk and a food acid. The process of the present invention provides a means for making smooth-textured beverage products which contain milk and a food acid, but which exhibit little or no sedimentation and which are visually opaque, without the need for homogenization during the preparation of the beverages.

BACKGROUND OF THE INVENTION

Beverages containing milk and fruit juice are well known and have long been considered desirable. It is known that the acid found in fruit juices can cause coagulation and curdling of milk when added to milk in amounts sufficient to lower milk's natural pH of 6.4–6.7 to below the isoelectric point (pH 4.6) of milk proteins. It is known that milk and juice blends can be made with previously acidified or soured milk. See, for example, U.S. Pat. No. 3,764,710. Unfortunately, beverages made in this manner tend to separate within a short time.

Food stabilizers including pectin, carboxymethylcellulose, xanthan gum, locust bean and combinations thereof have been used to prevent the coagulation and curdling of the milk and to provide stability to the beverages. See, for example, U.S. Pat. Nos. 2,818,342, 2,853,386 and 4,046,925, 4,078,092. Unfortunately, even when these food stabilizers are employed, beverage products containing milk and juice tend to exhibit undesirable sedimentation/precipitation over time.

A variety of means have been proposed to provide physical stability to beverage products which contain milk and juice. For example, U.S. Pat. Nos. 2,853,386 describes a beverage product which contains milk and juice and which is stable over time. However, the beverage product described therein requires prompt refrigeration after addition of the fruit juice so that the product will gel and prevent separation of ingredients. U.S. Pat. Nos. 4,061,792 describes the removal of tannins from juices before the addition to milk to reduce the curdling tendency of milk. U.S. Pat. Nos. 4,676,988 describes a cation/anion exchange process used to treat milk before adding acidic juices that minimizes curdling and/or precipitation. A number of other patents (for example, U.S. Pat. Nos. 3,625,702, 3,692,532, and 4,212,893) describe processes for preparing stable beverage products which contain milk and juice, but these processes require homogenization of the beverage which can be very expensive.

It would be desirable, therefore, to provide a stable beverage product which contains milk and juice, but which does not require homogenization or other special conditions (e.g., prompt refrigeration, removal of tannins from the juice or cation/anion exchange) to prevent separation of ingredients. The present invention relates to a process for preparing chilled or shelf stable beverage products which contain milk and a food acid (e.g. fruit juice), but which exhibit little or no sedimentation/precipitation over time and which are visually opaque. Moreover, the process of the present invention does not require homogenization in order to achieve these benefits.

SUMMARY OF THE INVENTION

The present invention relates to a process for preparing chilled or shelf stable smooth beverage products which contain milk and a food acid. The chilled or shelf stable beverage products prepared according to the process of the present invention are stable, visually opaque and do not precipitate over time. These products comprise from about 5% to about 99.8% milk, from about 0.05% to about 0.80% of a food stabilizer and a food acid.

The process of the present invention comprises as a first step mixing the milk (protein) with a food stabilizer under high shear mixing conditions to form protein/stabilizer particles having a median particle size of less than about 0.80 microns. Then, while still maintaining the median particle size of the protein/stabilizer particles at less than 0.80 microns, the protein/stabilizer mixture is acidified to a pH ranging from about 3.2 to about 4.5. In order to maintain the requisite particle size of the protein/stabilizer particles during the acidification step, the protein/stabilizer mixture is maintained under high shear mixing conditions at a temperature ranging from about 4° to about 30° C.

DETAILED DESCRIPTION OF THE INVENTION

The present invention relates to a process for preparing chilled or shelf stable beverage products which contain milk and a food acid. The smooth-textured beverage products prepared according to the process of the present invention exhibit little or no sedimentation over time and are visually opaque. Moreover, the process of the present invention does not require homogenization during the preparation of the beverages to achieve these benefits. Therefore, the process of the present invention represents a significant cost benefit compared to prior processes which required more expensive homogenization procedures in order to obtain the benefits described herein.

It is known that beverage products containing milk and acid (e.g., fruit juice) can be stabilized via incorporation into the beverage of a food stabilizer, such as pectin. Beverage products which contain milk and acid and which employ a food stabilizer are typically prepared by mixing together the milk and the stabilizer, homogenizing the mixture, and then acidifying the mixture with fruit juice and/or food acid. It has been found that the physical stability of beverage products which contain milk and acid and which employ a food stabilizer, is dependent on the median particle size of the protein/stabilizer particles as they are formed and throughout the acidification step. In particular, beverage products which contain milk and acid, but which exhibit little or no sedimentation and which are visually opaque can be prepared when the median particle size of the protein/stabilizer particles upon their acidification is less than about 0.80 microns, and when the median particle size of the protein/stabilizer particles is maintained in this range throughout the blend process. It has further been found that it is possible to form protein/stabilizer particles of the requisite size and maintain them at this size during the acidification step, without the need for homogenization of the beverage, by subjecting the protein/stabilizer particles to high shear mixing conditions as they are formed during the acidification step as hereinafter described.

The process of the present invention, including the materials used therein, the particular process steps, and the characteristics of the beverage products prepared according to this process are described in detail as follows:

A. Process Materials

The materials employed in the process of the present invention include milk, a food acid and food stabilizer, as well as other optional ingredients. These are described more particularly as follows:

1. Milk

The milk solids used in the process of the present invention may be provided by all forms (mammalian or vegetable source) of milk including, but not limited to, whole milk, skim milk, condensed milk, and dried milk powder. As used herein, the term "milk" will be used to describe an aqueous dispersion of milk solids, such as fluid (whole or skim milk) or non-fat dry milk or condensed milk diluted with water.

The amount of milk employed in the process of the present invention and present in the final beverage products will typically range from about 5% to about 99.8%, preferably from about 5% to about 75%, more preferably from about 5% to about 40%, and most preferably from about 5% to about 15%. The amount of milk solids non-fat correlating to these levels of milk ranges from about 0.5% to about 8.23%, 0.5% to about 6.19%, 0.5% to about 3.3% and 0.5% to 1.24% of the beverage, respectively.

2. Food Acid

The process of the present invention also employs a food acid. The food acid can include any food grade organic or inorganic acid, for example, citric acid, malic acid, lactic acid, gluconic acid, succinic acid, tartaric acid, phosphoric acid, fumaric acid, and ascorbic acid. Aliphatic hydroxycarboxylic acids (e.g., malic acid, lactic acid, and citric acid) are especially preferred for use herein. Citric acid is most preferred for use herein.

The amount of acid employed is an amount sufficient to adjust the pH of the milk/stabilizer mixture to from about 3.2 to about 4.5, preferably from about 3.5 to about 4.5, most preferably from about 3.5 to about 3.8. This will be discussed in more detail in section B hereinafter. Typically the food acid is added in an amount ranging from about 0.2% to about 0.4% by weight of the beverage. It is also within the scope of this invention to increase the level of the food acid up to about 1% by buffering the pH with buffering salts, such as, for example, sodium citrate.

3. Stabilizer

The various food stabilizers which can be employed in the present invention include hydrophilic colloidal stabilizers commonly known in the art such as gum arabic, gelatin, xanthan, locust bean, and pectin, as well as anionic polymers derived from cellulose (e.g., carboxymethylcellulose), which are water soluble and tolerant of low pH's encountered in citrus fruits. A blend of pectin and carboxymethylcellulose is especially preferred for use herein.

The stabilizer is typically used in an amount ranging from about 0.05% to about 0.80% by weight of the beverage, preferably from about 0.10% to about 0.60%, most preferably from about 0.10% to about 0.30%. The amount of stabilizer used is dependent in part on the level of milk solids present in the beverage product. In general, the greater the level of milk solids present in the beverage, the more stabilizer that will be required to stabilize the beverage.

4. Other Ingredients

The process of the present invention can optionally, and preferably does, include a fruit juice component. The fruit juice can be any citrus juice, non-citrus juice or mixture thereof, which are known for use in beverage products. Examples of such fruit juices include, but are not limited to, non-citrus juices such as apple juice, grape juice, pear juice, nectarine juice, currant juice, raspberry juice, gooseberry juice, blackberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice and mixtures thereof. Other fruit juices, and nonfruit juices, such as vegetable or botanical juices, can be used as the juice component of the beverages herein. Orange juice is especially preferred for use herein.

The beverages prepared according to the present invention typically contain from about 1% to about 95% fruit juice, preferably from about 3% to about 50% fruit juice, most preferably from about 3% to about 15% fruit juice. The fruit juice can be incorporated into the beverage product as a puree, comminute or as a single strength or concentrated juice. Most preferred is the incorporation of a fruit juice as a concentrate with a solids content (primarily as sugar solids) of between 20° and 80° Brix.

The process of the present invention can also employ fruit or other flavors, alone or in combination with fruit juice.

The process of the present invention also typically employs an added water component. The added water component typically comprises from about 1 to about 90% of the beverage, preferably from about 50% to about 90%, most preferably from about 70% to about 88%. For purposes of defining the beverage products prepared according to the process of the present invention, the added water component does not include water incidentally added to the beverage via other added materials, such as, for example, the fruit juice component.

The process of the present invention can also employ a sweetener. The sweetener can include, for example, maltose, sucrose, glucose, fructose, invert sugars and mixtures thereof. These sugars can be incorporated into the beverage products in solid or liquid form, but are typically incorporated as a syrup, more preferably as a concentrated syrup such as high fructose corn syrup. For purposes of preparing the beverage products described herein, these optional sweeteners can be provided to some extent by other components of the beverage products, such as by the fruit juice component, optional flavorants, and so forth. Sweeteners are typically employed in the process of the present invention in amounts ranging from about 0.1% to about 20%, more preferably from about 6% to about 14%, sugar solids by weight of the beverage products Preferred carbohydrate sweeteners for use in the process of the present invention are sucrose, fructose and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein of fructose.

Optional artificial or noncaloric sweeteners for use in the process of the present invention include, for example, saccharin, cyclamates, acetosulfam, L-aspartyl-L-phenyalanine lower alkyl ester sweeteners (e.g., aspartame). L-aspartyl-D-alanine amides disclosed in U.S. Pat. 4,411, 930 to Brennan et al., L-aspartyl-D-serine amides disclosed in U.S. Pat. No. 4,399,163 to Brennan et at., L-aspartyl-L-1-hydroxymethyl-alkaneamide sweeteners disclosed in U.S. No. Pat. 4,338,346 to Brand, L-aspartyl-1-hydroxyethylakaneamide sweeteners disclosed in U.S. Pat. No. 4,423,029 to Rizzi, L-aspartyl-D-phenylglycine ester and amide sweeteners disclosed in European Pat. Application 168,112 to J. M. Janusz, published Jan. 15, 1986, and the like. A particularly preferred sweetener is aspartame. Artificial or noncaloric sweeteners, if used, are typically employed in an amount ranging from about 0.05% to about 1%, preferably from about 0.05% to about 0.10% by weight of the beverage products.

The process of the present invention can also optionally employ a preservative. Any food grade preservative can suitably be used in the process of the present invention. Suitable preservatives include sorbic acid, benzoic acid, alkali metal salts thereof, and mixtures thereof. Preferred preservatives include sorbic acid, potassium sorbate, sodium sorbate and mixtures thereof. Potassium sorbate is most preferred for use herein. The preservative is typically present in an amount ranging from about 0.04% to about 0.10% by weight of the beverage product, preferably from about 0.04% to about 0.08%, more preferably from about 0.06% to about 0.75%.

The process of the present invention can also optionally employ additional thickeners. Suitable thickeners for use in the process of the present invention include, for example, carboxymethylcellulose, xanthan gum, locust bean, guar, carrageenan, and pectin. Carboxymethylcellulose and pectin are especially preferred for use herein. The thickener is typically present in an mount ranging from about 0% to about 0.80%, preferably from about 0.1% to about 0.60%, most preferably from about 0.1% to about 0.30%.

The process of the present invention can also be fortified with various vitamins and minerals. Especially preferred are erythorbic acid and ascorbic acid, although it is understood that other vitamins and minerals can also be used. The process of the present invention also preferably employs a soluble calcium source comprising specific ratios of calcium, citrate and malate. See U.S. Pat. No. 4,737,375; Issued Apr. 12, 1988; to Nakel et al, which is herein incorporated by reference.

B. Process Steps

The process of the present invention comprises as a first step mixing the milk (protein) and the food stabilizer in a mixing tank under high shear mixing to form protein/stabilizer particles having a median particle size of less than about 0.8 microns, preferably less than about 0.50 microns, most preferably less than about 0.30 microns. As used herein the term "high shear" refers to conditions as exemplified by, but not limited to, an impeller (e.g., pitch blade turbine or chemshear) with tip speed greater than 600 ft/min., preferably greater than 1200 ft./min. or a high shear roto-stator device with shear rate of about 45,000 sec$^{-1}$. High shear conditions can be created with numerous commercial mixing systems, for example, Likwifier, Liquiverter, etc.

In order to form protein/stabilizer particles of the requisite size, the milk and the stabilizer are mixed under the preferred combination of impeller velocity and tank turnover (determined by batch size and solution viscosity). For example, a pitch blade turbine operated most preferably with an impeller velocity of at least 1000 ft/min. (900 rpm, 2.54 inch impeller) for a 650 ml batch in a 1.25 liter vessel. Common for those practiced in the art, other high shear mixers and/or mixer blade configurations may also be employed in the process of the present invention.

In order to fully realize the benefits of the process of the present invention, it is preferred that, upon initiation of high shear mixing, that the stabilizer be added first, and that the milk be added subsequently. While continuing high shear mixing, the milk (protein) and stabilizer solution is acidified with a food acid of the type and in the amounts hereinbefore described. In a preferred embodiment of the process of the present invention, the milk/stabilizer solution is acidified with citric acid to a concentration of greater than about 10 mM and to a pH ranging from about 3.2 to about 4.5, preferably from about 3.5 to about 4.5, most preferably from about 3.5 to about 3.8.

In order to obtain the benefits of the process of the present invention, it is critical that during the acidification step, the median particle size of the protein/stabilizer particles be maintained at less than 0.8 microns, preferably less than about 0.50 microns, most preferably less than about 0.30 microns. As hereinbefore described, it has been found that creating protein/stabilizer particles having a median particle size of less than about 0.8 microns and maintaining the particles in this range during acidification results in a finished beverage product that is characterized by little to no sedimentation and high visual opacity. Moreover, creating the desired particle size during acidification eliminates the need for employing an expensive homogenization step during manufacturing.

In addition to the high shear conditions, the particular acid chosen to acidify the protein/pectin solution, the concentration of the acid and the method of acid addition also have an effect on the median particle size of the protein/stabilizer particles. In general, it has been found that smaller protein/stabilizer particles can be created when the concentration of the citric acid, the preferred acid, in the acidified solution is greater than 10 mM, preferably greater than 15 mM. Also, although the acid can be added all at once, it is preferred to add the acid slowly to facilitate homogeneous dissolution of the acid. In particular, it is preferable to add the acid at less than 20 pounds/minute, more preferably less than 15 pounds/minute.

In order to maintain the median particle size of the protein/stabilizer particles in the appropriate range, it is also critical that the temperature of the protein/stabilizer solution during the acidification step be maintained at from about 4° C. to about 30° C. Preferably, the temperature is maintained in the range of from about 4° C. to about 20° C, most preferably from about 4° C. to about 15 ° C.

It is hypothesized that the combination of high shear mixing, acidulant, and low temperature create the maximum surface area for protein and stabilizer interaction. During the acidification process, the stabilizer coats the surface of the small protein particles thus creating a charged barrier that prevents further protein agglomeration and particle growth and coagulation. These acid-stabilized protein/stabilizer particles are then fixed for further processing and require no homogenization to meet the desired finished product characteristics.

When the acidification step is complete (e.g., when the pH of the milk and stabilizer solution ranges from about 3.2 to about 4.5) the acidified milk/stabilizer solution is combined with the remainder of the ingredients under at least low shear conditions. As used herein, the term "low shear" refers to non-turbulent (e.g., laminate or transition) flow as exemplified by, but not limited to, a pitch blade turbine with tip speed of 200 ft/min.

In a preferred embodiment of the process of the present invention, an acidified protein stabilizer preblend is prepared in a mixing tank (e.g., in-line mixer) with high shear mixing, and then the remainder of the ingredients are mixed in under at least low shear mixing conditions. When citric acid, the preferred acid, is used as the food acid, the concentration of citric acid in the acidified preblend solution typically employed is greater than about 35 mM, preferably greater than about 50 mM, more preferably greater than about 80 mM. Alternatively, the acidified protein/stabilizer preblend can be prepared in a tank under high shear conditions, and then the mixture can be moved to another tank where the remaining ingredients are added under at least low shear conditions.

C. Characteristics of the Beverage Products Prepared According to the Process of the Present Invention The chilled or shelf stable beverage products prepared according to the process of the present invention have a pH ranging from about 3.2 to about 4.5, preferably from about 3.5 to about 4.5, most preferably from about 3.5 to about 4.2. The beverage products exhibit little/no sedimentation and are highly visually opaque for 120 days or more. The beverages described herein are smooth-textured. These beverages can be carbonated or noncarbonated, but preferably contain less than one volume of carbonation.

ANALYTICAL METHODS

Method for Measuring Particle Size of Protein/Stabilizer Particles

The particle size distribution of the protein/stabilizer particles formed in the process of the present invention is measured using a laser scattering system, Horiba LA900 (Horiba, Calif.). Two types of distributions are used to properly define particle size. First, the Volume Distribution is used to follow structural changes and the effect of large particles in small number; this Volume Distribution usually results in a bimodal (sometimes trimodal) curve. Second, Number Distribution is used to measure the number of particles of a given median particle size. Typically, the Number Distribution results in a single peak which is properly characterized by its median. For median particle size below 0.5, there is no significant difference between median and mean particle size. However, we prefer to use median particle size to account for proper description for cases which depart from normal distribution. 1 to 2 ml samples are prepared according to the procedures recommended by the equipment manufacturer.

EXAMPLES

Example 1

An acidified milk preblend solution is prepared in a typical commercial mixer (Ross Roto-Stator Device). With continuous blending, 6.8 g of pectin and 8.6 g of CMC gum are added to 700 g of 15° C. water. After blending for several minutes, 68 g of non fat dry milk powder is added with continued blending. After several minutes, 11.5 g of citric acid powder is added. The particle size of the acidified protein/stabilizer particle is less than 0.8 microns.

Example 2

An orange beverage of the present invention is prepared having the following formulation

| Ingredient | % w/w |
|---|---|
| Water | 72.3 |
| Non-fat milk | 10.0 |
| Sweetener | 12.0 |
| Orange juice | 5.0 |
| Citric Acid | 0.28 |
| Pectin/Carboxymethylcellulose blend | 0.30 |
| Orange Flavors | 0.17 |

For a 1000 gal finished product batch, an acidified protein/stabilizer preblend solution is prepared in a tank fitted with high shear mixer, e.g., a 400 gal. Liquiverter (Alfa Laval Model ) as follows: The lank is loaded with 150 gal of 50° F. water. Under agitation, the pectin and CMC gum are added and mixed for several minutes. Non-fat milk powder is then added and further mixed for several minutes. With continued high speed agitation the dry citric acid powder is added at a rate of 15 pounds/minute to a concentration of 80 mM. The pH of the resultant solution is 3.8. The median particle size of the protein/pectin particles ranges from 0.30 microns to 0.50 microns.

The acidified milk and gum preblend solution is then added to a blend tank with the remaining ingredients. The blend tank is agitated with a sweep agitator at 28 rpm. The final blend has a pH of 3.7 to 4.1. This blend is pasteurized at 187±3° F. for 13±3 seconds and conventionally bottled. The bottled product exhibits little or no sedimentation.

What is claimed is:

1. In a process for preparing chilled or shelf stable smooth beverage products which have a pH ranging from about 3.2 to about 4.5 and which exhibit little or no sedimentation or precipitation over time and which are visually opaque, wherein the beverage products comprise:
   a. from about 5 to about 99.8% milk;
   b. from about 0.05 to about 0.8% of a food stabilizer; and
   c. a food acid;
   the improvement which comprises the steps of:
   i) mixing the milk with the food stabilizer under high shear conditions to form protein/stabilizer particles having a median particle size of less than about 0.8 microns; and
   ii) adding a sufficient amount of the food acid to the protein/stabilizer mixture to adjust the pH of the mixture to from about 3.2 to about 4.5, wherein the mixture is subjected to high shear conditions throughout the addition of the acid, wherein the temperature of the mixture is maintained at from about 4° to about 30° C., and wherein the median particle size of the protein/stabilizer particles is maintained at less than about 0.8 microns throughout the addition of the acid.

2. The process of claim 1 wherein the food acid is citric acid.

3. The process of claim 2 wherein the food stabilizer is a blend of pectin and carboxymethylcellulose.

4. In a process for preparing chilled or shelf stable smooth beverage products which have a pH ranging from about 3.2 to about 4.5 and which exhibit little or no sedimentation or precipitation over time and which are visually opaque, wherein the beverage products comprise:
   a. from about 5 to about 99.8% milk;
   b. from about 0.05 to about 0.8% of a food stabilizer; and
   c. a food acid;
   the improvement which comprises the steps of:
   i) mixing the milk with the food stabilizer under high shear conditions to form protein/stabilizer particles having a median particle size of less than about 0.8 microns;
   ii) adding a sufficient amount of the food acid to the protein/stabilizer mixture to adjust the pH of the mixture to from about 3.2 to about 4.5, wherein the mixture is subjected to high shear conditions throughout the addition of the acid, wherein the temperature of the mixture is maintained at from about 4° to about 30° C., and wherein the median particle size of the protein/stabilizer particles is maintained at less than about 0.8 microns throughout the addition of the acid; and
   iii) adding any optional ingredients to the acidified mixture under at least low shear conditions to prepare a beverage product having a pH ranging from about 3.2 to about 4.5.

5. The process of claim 4 which additionally comprises from about 1% to about 95% of a fruit juice.

6. The process of claim 5 wherein the food acid is selected from the group consisting of citric acid, malic acid, lactic acid, gluconic acid, succinic acid, tartaric acid and ascorbic acid.

7. The process of claim 6 wherein the food acid is citric acid.

8. The process of claim 7 which comprises from about 5% to about 75% of milk.

9. The process of claim 8 wherein the beverage product additionally comprises from about 50% to about 90% of added water.

10. The process of claim 9 wherein the median particle size of the protein/stabilizer particles is less than about 0.5 microns.

11. The process of claim 10 wherein the fruit juice comprises citrus juice.

12. The process of claim 11 wherein the fruit juice comprises orange juice.

13. In a process for preparing chilled beverage products which have a pH ranging from about 3.5 to about 4.5 and which exhibit little or no sedimentation or precipitation over time and which are visually opaque, wherein the beverage products comprise:

a. from about 5 to about 15% milk;

b. from about 3 to about 15% fruit juice;

c. from about 0.1 to about 0.3% of a food stabilizer;

d. from about 0.2 to about 1% of a food acid;

e. from about 70 to about 88% added water;

f. from about 6 to about 14% of a sweetener;

g. from about 0.06 to about 0.75% of a preservative; and h. from about 0.1 to about 0.3% of a thickener;

the improvement which comprises the steps of:

i) mixing the milk with the food stabilizer under high shear conditions to form protein/stabilizer particles having a particle size of less than about 0.5 microns;

ii) adding a sufficient amount of the food acid to the protein/stabilizer mixture to adjust the pH of the mixture to from about 3.5 to about 4.5, wherein the mixture is subjected to high shear condition throughout the addition of the acid, wherein the temperature of the mixture is maintained at from about 4° to about 30° C., and wherein the median particle size of the protein/stabilizer particles is maintained at less than about 0.5 microns throughout the addition of the acid; and iii) adding the remaining ingredients to the acidified mixture to prepare a beverage product having a pH ranging from about 3.5 to about 4.5.

14. The process of claim 13 wherein the food acid comprises citric acid.

15. The process of claim 14 wherein the fruit juice comprises orange juice.

16. The process of claim 15 wherein the sweetener comprises high fructose corn syrup.

17. The process of claim 16 wherein the stabilizer comprises a pectin/carboxymethylcellulose blend.

18. The process of claim 17 wherein the preservative is potassium sorbate.

\* \* \* \* \*